US010561274B2

(12) United States Patent
Huang

(10) Patent No.: US 10,561,274 B2
(45) Date of Patent: Feb. 18, 2020

(54) MULTIFUNCTION ELECTRIC OVEN

(71) Applicant: ZHUHAI FEILONG ELECTRIC APPLIANCE CO., LTD., Zhuhai, Guangdong (CN)

(72) Inventor: Chaolong Huang, Zhuhai (CN)

(73) Assignee: ZHUHAI FEILONG ELECTRIC APPLIANCE CO., LTD., Zhuhai, Guangdong (CN)

( * ) Notice: Subject to any disclaimer, the term of this patent is extended or adjusted under 35 U.S.C. 154(b) by 394 days.

(21) Appl. No.: 15/647,071

(22) Filed: Jul. 11, 2017

(65) Prior Publication Data

US 2019/0014944 A1   Jan. 17, 2019

(51) Int. Cl.
| | |
|---|---|
| A47J 37/00 | (2006.01) |
| A47J 37/04 | (2006.01) |
| F24C 15/02 | (2006.01) |
| F24C 15/24 | (2006.01) |
| F24C 7/06 | (2006.01) |
| A47J 37/01 | (2006.01) |
| A47J 37/06 | (2006.01) |
| F24C 15/16 | (2006.01) |

(52) U.S. Cl.
CPC ............ *A47J 37/041* (2013.01); *A47J 37/015* (2013.01); *A47J 37/0629* (2013.01); *F24C 7/062* (2013.01); *F24C 15/028* (2013.01); *F24C 15/164* (2013.01); *A47J 37/04* (2013.01); *F24C 15/02* (2013.01)

(58) Field of Classification Search
None
See application file for complete search history.

(56) References Cited

U.S. PATENT DOCUMENTS

| | | | | |
|---|---|---|---|---|
| 5,548,102 A | * | 8/1996 | Kwon ................. | H05B 6/6411 219/404 |
| 5,793,023 A | * | 8/1998 | Hong .................. | H05B 6/6482 219/404 |
| 6,111,226 A | * | 8/2000 | Lee ..................... | A47J 37/0623 219/392 |
| 6,917,018 B1 | * | 7/2005 | Wong ....................... | F24C 7/06 219/404 |
| 7,325,484 B1 | * | 2/2008 | Backus ................ | A47J 37/041 99/421 H |
| 2003/0222073 A1 | * | 12/2003 | Moon .................. | A47J 37/0623 219/404 |

(Continued)

*Primary Examiner* — Joseph M Pelham
(74) *Attorney, Agent, or Firm* — Leason Ellis LLP

(57) ABSTRACT

A multifunctional electric oven is equipped so that it is easy to change the placement of food and to utilize different heating methods, with high heating efficiency, energy saving and convenient to operation. The multifunctional electric oven comprises a main body assembly, an electric control assembly, an upper acting door, and a side acting door. The electric assembly is located on the main body assembly. The upper acting door and the side acting door are located separately at the top and front of the main body assembly. When the two doors are closed they and the main body assembly together form a closed heating cavity with a heating tube inside. The heating tube can be rotated so as to be placed in a flat position or an upright position. The upper acting door and the side acting door can be opened or closed individually or jointly, to achieve different cooking functional modes.

12 Claims, 5 Drawing Sheets

(56) References Cited

U.S. PATENT DOCUMENTS

| | | | | |
|---|---|---|---|---|
| 2004/0144260 | A1* | 7/2004 | Backus | A47J 37/041 |
| | | | | 99/419 |
| 2006/0225580 | A1* | 10/2006 | Fernandez | A47J 37/041 |
| | | | | 99/419 |
| 2008/0110873 | A1* | 5/2008 | Ho | F24C 7/06 |
| | | | | 219/396 |
| 2008/0149618 | A1* | 6/2008 | Chung-Ting | A47J 37/0623 |
| | | | | 219/393 |
| 2008/0308544 | A1* | 12/2008 | Li | A47J 37/048 |
| | | | | 219/392 |
| 2010/0089248 | A1* | 4/2010 | Jones | A47J 37/0641 |
| | | | | 99/444 |

* cited by examiner

MULTIFUNCTION ELECTRIC OVEN

FIELD OF THE INVENTION

The present invention relates to an electric oven and, more particularly to a multifunctional electric oven.

BACKGROUND OF THE INVENTION

Electric oven is a kind of kitchen appliances used for food baking by consuming electric energy to convert into heat energy. At present, there are many kinds of electrical appliances, such as electric ovens, which have their own advantages and disadvantages. However, it has many disadvantages, such as poor multi-purpose function performance, large volume, low heating efficiency and slow heating. The current electric heating food appliances, especially for the barbecue utensils, cannot aim at the specific shape and the certain features of the food when the food is heated, to change the way food is placed and heated.

For example, only a single way to put the food flat or a single way to hang the food to be heated, therefore, the scope of its application is limited. For example, the existing electric oven is generally only equipped with one door, the food needs to be put into the oven to roast with the door closed. It's hard to put assistive accessories such as long skewers into the oven for BBQ, so it's difficult to operate and not convenient to use; As for the current BBQ appliances, it is often with an open structure, so it's difficult to keep the food in a good closed cavity, so heat loss is relatively large, and cannot do other closed type roasting; the above mentioned two kinds of roast modes contradict each other, so it is difficult to combine the two modes together.

SUMMARY OF THE INVENTION

The technical problem to be solved by the invention is to overcome the deficiency of the current technology. The invention provides a multifunctional electric oven in which is easy to change the placement of food and heating methods, with high heating efficiency, energy saving and convenient to operation.

The technical proposal adopted by the invention is that the invention comprises a main body assembly, electric control assembly, upper acting door and side acting door. The mentioned electric assembly is located on the mentioned main body assembly. The mentioned upper acting door and the mentioned side acting door are located separately at the top and front of the mentioned main body assembly. When the two doors are closed, with the mentioned main body assembly, they together form a closed heating cavity. The mentioned heating cavity has a heating tube inside, which mentioned heating tube can be rotated to be placed in a flat position and placed in an upright position. The mentioned upper acting door and the mentioned side acting door can be opened or closed individually or jointly, to achieve different cooking functional modes.

The mentioned electric oven, which comprises a grill, the mentioned main body assembly, there is a heating cavity inside, the middle place of the two sides with symmetric slot, the mentioned grill can be removable and inserted into the slot, the mentioned grill located above the heating tube), to roast the foods put on the mentioned grill.

The mentioned electric oven, which comprises a baking pan, the mentioned baking pan can be put on the mentioned grill, or put at the bottom of the main body assembly as drip pan.

The mentioned side acting door is open and when the mentioned heating tube placed in flat position, the food can be placed or taken out through the mentioned side acting door, in order to be heated above the heating tube to realize BBQ function mode.

The mentioned upper acting door is open and when the mentioned heating tube placed in flat position, the food put on baking pan can be placed or taken out through the upper acting door, in order to be heated above the heating tube, to realize frying, stir-frying, roasting function mode.

The mentioned electric oven, which comprises rotisserie kit, motor, quick joint, the mentioned rotisserie kit is connected with the output end of the motor through a demountable quick joint, when the mentioned heating tube is placed in upright position, the mentioned motor drives the rotisserie kit and the food on it to rotate thereof, the food can be placed or taken out through the upper acting door, and ingredients can be added when roasting, the mentioned heating tube heats the food in front of it, to realize automatic rotary roast mode.

The mentioned electric oven, which also comprises an inductive switch for detecting the status of the mentioned upper acting door and the mentioned heating tube: when the mentioned inductive switch detects that the mentioned heating tube is placed in upright position, the mentioned heating tube can be operated only when the mentioned upper acting door closed, and under the control of the mentioned electric control assembly; when the mentioned inductive switch detects that the mentioned heating tube is placed in flat position, the mentioned motor cannot work.

The mentioned electric oven, which comprises the mentioned upper acting door (3) and/or the mentioned side acting door (4) with air interlayer, to reduce heat transfer to outside.

The mentioned upper acting door and/or the mentioned side acting door are in the form of turning or rotating or pushing; the mentioned upper acting door, the mentioned side acting door are provided with handle.

The mentioned heating tube is in a serpentine shape. The mentioned electric control assembly includes a switch, a timer, a temperature controller and a control chip.

The invention has the advantages that the invention comprises a main body assembly, electric control assembly, upper acting door, side acting door, the mentioned electric assembly is located at the top and front of the main body assembly, when the two doors are closed, with the mentioned main body assembly together forming a closed heating cavity, the mentioned heating cavity with heating tube inside, the mentioned heating tube can be rotated to be placed in flat position and placed in upright position, the mentioned upper acting door, the mentioned side acting door can be opened or closed separately to achieve different roast function mode;

By opening or closing the mentioned upper acting door, the mentioned side acting door and with the heating tube to be placed in flat or upright position, the heating cavity can be turned on or off in an upward direction or a forward direction, so the invention can realize various combination roast mode. For example, when the upper acting door and the side acting door are closed, a closed heating cavity can be formed to do ordinary baking or rotary roasting. When the side acting door is opened, it is convenient for taking food from the front, especially very applicable for the BBQ. The technical problem to be solved by the invention is to overcome the deficiency of the current technology, to combine at least two roast modes that cannot be combined before. The invention is easy to change the placement of food and heating methods, with high heating efficiency, energy saving and convenient to operation, and with different heating modes can be used for various foods.

BRIEF DESCRIPTION OF DRAWINGS

The foregoing and other objects and advantages of the present invention will become more apparent when considered in connection with the following detailed description and appended drawings in which like designations denote like elements in the various views, and wherein.

DETAILED DESCRIPTION OF THE INVENTION

Embodiment I

Figure 1:
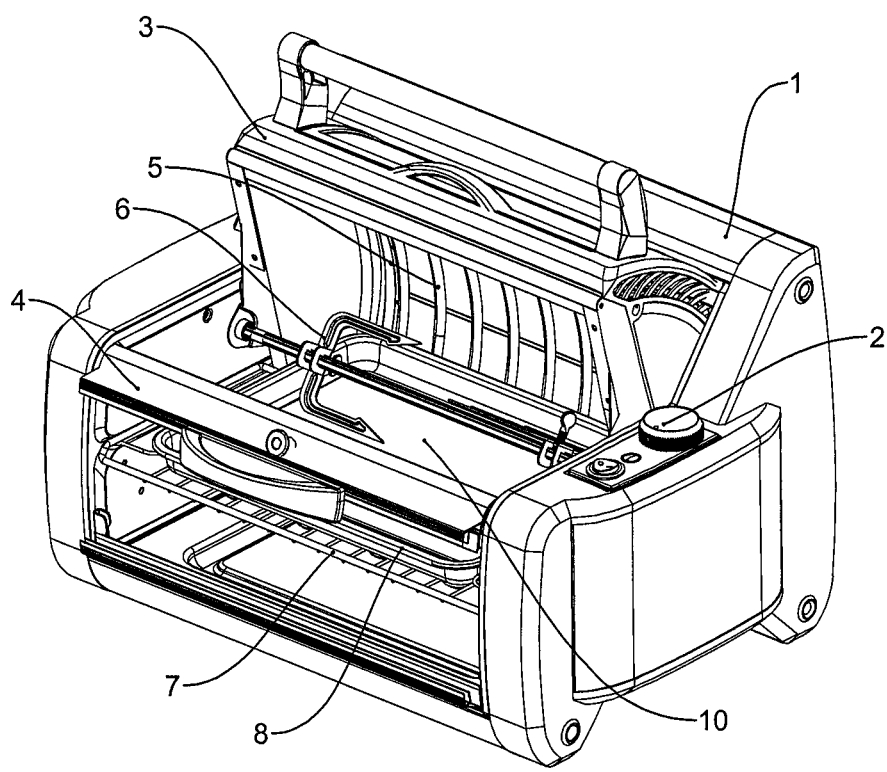
FIG. 1 is an illustration of a structure for implementing one or more embodiments of the present invention.
Figure 2:
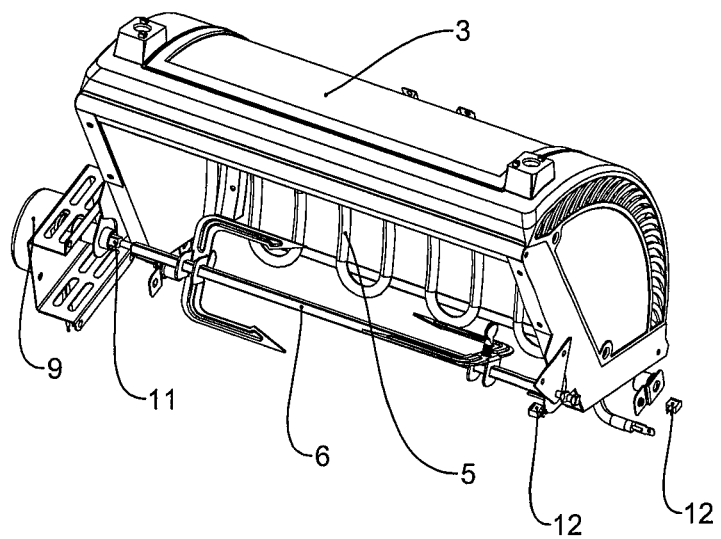
FIG. 2 is an illustration of an upper portion of the structure of FIG. 1 for implementing one or more embodiments of the present invention.

As shown on FIG. 1 and FIG. 2, the multifunctional electric oven of the implementing example one comprises a main body assembly (1), electric control assembly (2), upper acting door (3) and side acting door (4). The mentioned electric assembly (2) is located at the top and front of the mentioned main body assembly (1). The mentioned electric control assembly (2) includes a switch, a timer, a temperature controller and a control circuit. In the implementing example one, a switch, a timer and a temperature controller are provided with a mechanical knob type. The mentioned upper acting door (3) and the mentioned side acting door (4) are located separately at the top and front of the mentioned main body assembly (1). When the two doors are closed, with the mentioned main body assembly (1), they together form a closed heating cavity (10). The mentioned heating cavity (10) has a heating tube (5) inside. The mentioned heating tube (5) is in a serpentine shape. The mentioned heating tube (5) can be rotated to be placed in a flat position and placed in an upright position. The mentioned upper acting door (3) and/or the mentioned side acting door (4) may have an air interlayer to reduce heat transfer to the outside.

The mentioned upper acting door (3) and/or the mentioned side acting door (4) are in a form whereby they can be opened and closed by turning or rotating or pushing. The mentioned upper acting door (3) and the mentioned side acting door (4) are provided with a handle. The mentioned upper acting door (3) and the mentioned side acting door (4) can be opened or closed individually or jointly, to achieve different cooking functional modes. When the mentioned side acting door (4) is opened and the heating tube (5) is in the flat position, the food can be placed in or taken out through the mentioned side acting door (4), in order to be heated above the heating tube and to realize a BBQ function mode.

Figure 3:
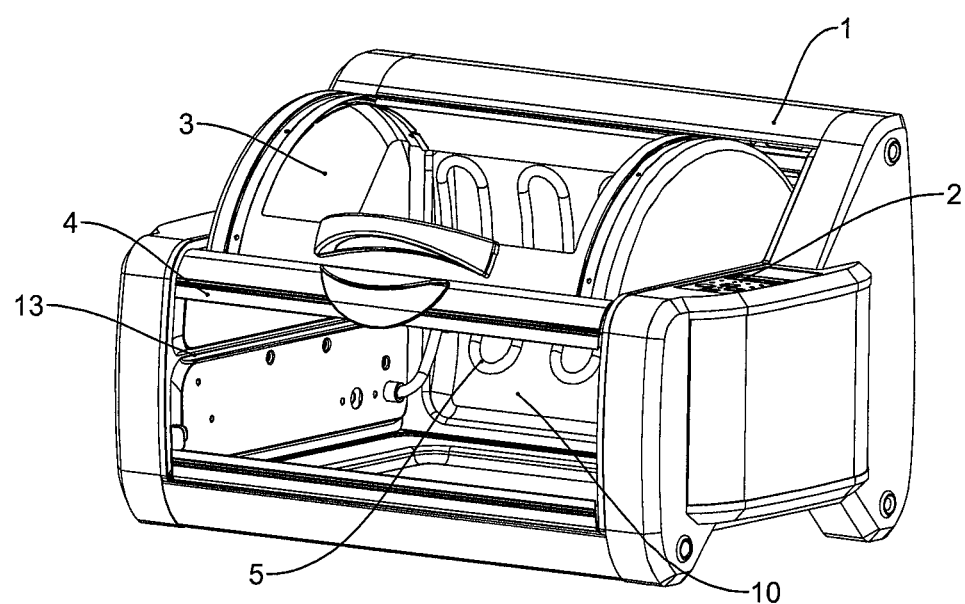
FIG. 3 is an illustration of the structure of FIG. 1 with the implements removed from the heating cavity and the upper door closed implementing one or more embodiments of the present invention.
Figure 4:
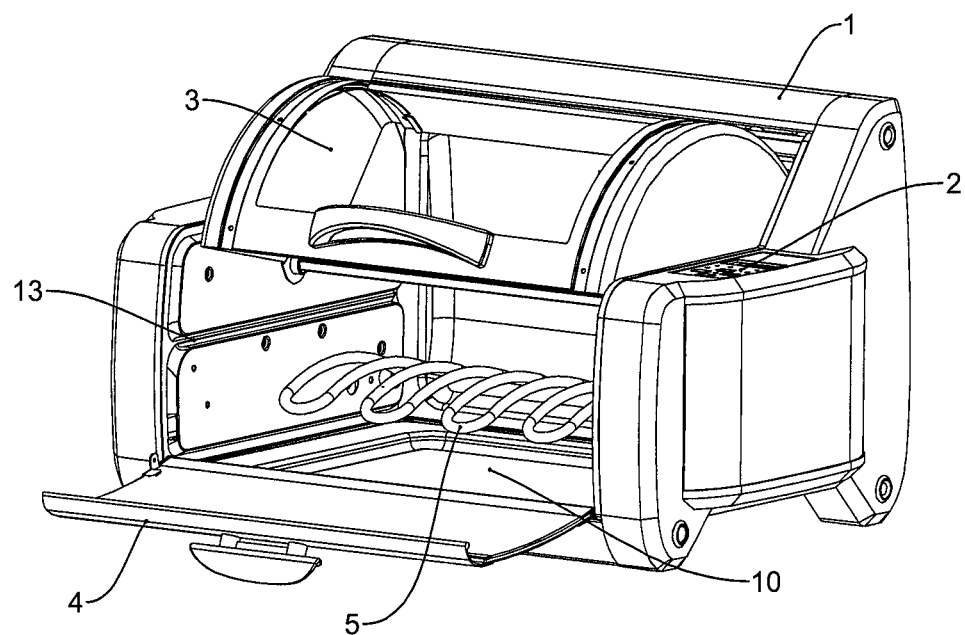
FIG. 4 is another illustration of the structure of FIG. 3 with the side acting door open and the upper acting door closed implementing one or more embodiments of the present invention.
Figure 5:
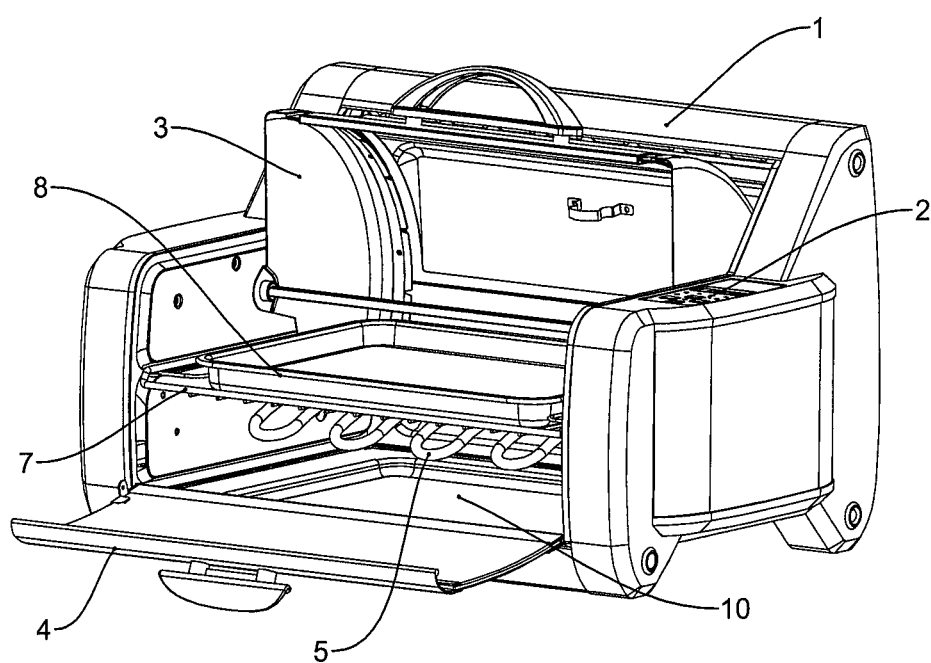
FIG. 5 is a further illustration of the structure of FIG. 4 with the upper acting door open implementing one or more embodiments of the present invention.

The mentioned electric oven may also comprise a grill (7). In the mentioned main body assembly (1) with the heating cavity (10) inside, at about the middle of the two sides there are symmetric slots (13). FIG. 3 The mentioned grill (7) can be removed from and inserted into the slots (13). The mentioned grill (7) is located above the heating tube (5) so as to roast the food put on the mentioned grill (7). The mentioned electric oven may further comprise a baking pan (8). The mentioned baking pan (8) can be put on the mentioned grill (7) (FIGS. 1 and 5), or put at the bottom of the main body assembly (1) as a drip pan. When the mentioned upper acting door (3) is open and when the mentioned heating tube (5) placed in the flat position, the food put on baking pan (8) can be placed in or taken out through the upper acting door (3), in order to be heated above the heating tube (5), to realize a frying, stir-frying, roasting function mode. The mentioned electric oven, which may also comprise a rotisserie kit (6), motor (9) and quick joint (11). FIGS. 1 and 2. The mentioned rotisserie kit (6) is connected with the output end of the motor (9) through the demountable quick joint (11). When the mentioned heating tube (5) is placed in the upright position, the mentioned motor (9) drives the rotisserie kit (6) and the food on it to rotate. The mentioned heating tube (5) heats the food in front of it, to realize an automatic rotary roast mode.

The mentioned electric oven, which may also comprise an inductive switch (12) for detecting the status of the mentioned upper acting door (3) and the mentioned heating tube (5). When the mentioned inductive switch (12) detects that the mentioned heating tube (5) is placed in the upright position, the mentioned heating tube (5) can be operated only when the mentioned upper acting door (3) is closed, and the heating tube is under the control of the mentioned electric control assembly (2). When the mentioned inductive switch (12) detects that the mentioned heating tube (5) is placed in the flat position, the mentioned motor (9) cannot work. The inductive switch (12) can be a light-operated switch or a touch switch.

Embodiment II

As shown on FIG. 1-FIG. 5, the difference between the multifunctional electric oven in implementing example one and the one in implementing example two is that a switch, a timer and a temperature controller of the mentioned electric control assembly (2) are provided with an electronic push-button. Of course, the oven can also be used with other forms of switches. The example shows that the mentioned upper acting door (3), the mentioned side acting door (4) and the mentioned heating tube (5) can be used in different combinations.

The rest of the features of this implementing example two are the same as the implementing example one.

By opening or closing the mentioned upper acting door (3), the mentioned side acting door (4) and with the heating tube to be placed in the flat or upright positions, the heating cavity (10) can be turned on or off in an upward direction or a forward direction, so the invention can realize various combination cooking modes. For example, when the upper acting door (3) and the side acting door (4) are closed, a closed heating cavity can be formed in order to perform ordinary baking or rotary roasting. When the side acting door (4) is opened, it is convenient for taking food from the front, and is especially very applicable for the BBQ mode.

The technical problem to be solved by the invention is to overcome the deficiency of the current technology by combining at least two roast modes that cannot be combined by the prior art. It is easy to change the placement of food and heating methods with the present invention while maintaining high heating efficiency, energy saving and convenience of operation, and with different heating modes for various foods.

The invention can be widely used in the field of food processing equipment.

While the present invention has been particularly shown and described with reference to preferred embodiments thereof; it will be understood by those skilled in the art that various changes in form and details may be made therein without departing from the spirit and scope of the invention.

I claim:

1. A multifunctional electric oven, comprising:
a main body assembly,
an electric control assembly located on the main body assembly,
an upper acting door located at the top of the main body assembly,
a side acting door located at the front of the main body assembly, and
a heating tube,
wherein, when the two doors are closed, the main body assembly together with the two doors form a closed heating cavity and the heating tube is located inside of the closed heating cavity,
wherein the heating tube can be rotated so as to be placed in either a flat position or an upright position, and
wherein the upper acting door and the side acting door can be opened or closed separately to achieve different roast function modes.

2. The multifunctional electric oven according to claim 1, further comprising a grill, and
wherein the heating cavity within the main body assembly has two opposed sides and midway between the top and bottom of the two sides there is a symmetric slot positioned so that the grill can be inserted into the slot so as to be above the heating tube in order to roast foods put on the grill and the grill can be removed from the slot.

3. The multifunctional electric oven according to claim 2, further comprising a baking pan, and
wherein the baking pan can be placed on the grill, or put at the bottom of the main body assembly as drip pan.

4. The multifunctional electric oven according to claim 1, wherein the side acting door is open and, when the heating tube is placed in the flat position, food can be placed into the heating cavity through the side acting door in order to be heated above the heating tube so as to realize a BBQ function mode and the food can be taken out through the side acting door.

5. The multifunctional electric oven according to claim 2, wherein the side acting door is open and, when the heating tube is placed in the flat position, food can be placed into the heating cavity through the side acting door in order to be heated above the heating tube so as to realize a BBQ function mode and the food can be taken out through the side acting door.

6. The multifunctional electric oven according to claim 3, wherein the side acting door is open and, when the heating tube is placed in the flat position, food can be placed into the heating cavity through the side acting door in order to be heated above the heating tube so as to realize a BBQ function mode and the food can be taken out through the side acting door.

7. The multifunctional electric oven according to claim 3, wherein the upper acting door is open and when the heating tube is placed in the flat position, food put on the baking pan can be placed into the heating cavity through the upper acting door in order to be heated above the heating tube so as to realize a frying, stir-frying, roasting function mode and the food can be taken out through the upper acting door.

8. The multifunctional electric oven according to claim 1, further comprising a rotisserie kit, a motor with an output end, and a demountable quick joint,
wherein the rotisserie kit is connected with the output end of the motor through the demountable quick joint, when the heating tube is placed in the upright position, the motor drives the rotisserie kit and causes the food on the rotisserie kit to rotate, and
wherein food can be placed into the heating cavity through the upper acting door, the heating tube roasts the food in front of it, and ingredients can be added to the food when roasting to realize an automatic rotary roast mode and the food can be taken out through the upper acting door.

9. The multifunctional electric oven according to claim 1, further comprising an inductive switch that detects the status of the upper acting door and the heating tube,
wherein, when the inductive switch detects that the heating tube is in the upright position, the heating tube can be operated only when the upper acting door is closed, and under the control of the electric control assembly, and
wherein, when the mentioned inductive switch detects that the heating tube is in the flat position, the motor cannot work.

10. The multifunctional electric oven according to claim 1, wherein the upper acting door and/or the side acting door further comprise an air interlayer to reduce heat transfer to outside of the oven.

11. The multifunctional electric oven according to claim 1, wherein the upper acting door and/or the side acting door are in a form whereby they can be opened and closed by turning or rotating or pushing, and
wherein the upper acting door and the side acting door each further comprise a handle.

12. The multifunctional electric oven according to claim 1, wherein the heating tube has a serpentine shape, and wherein the electric control assembly includes a switch, a timer, a temperature controller and a control semiconductor chip.

* * * * *